Nov. 26, 1935.  H. F. JOHNSTONE  2,021,936
REMOVAL OF SO2 FROM FLUE GASES
Filed Dec. 8, 1930
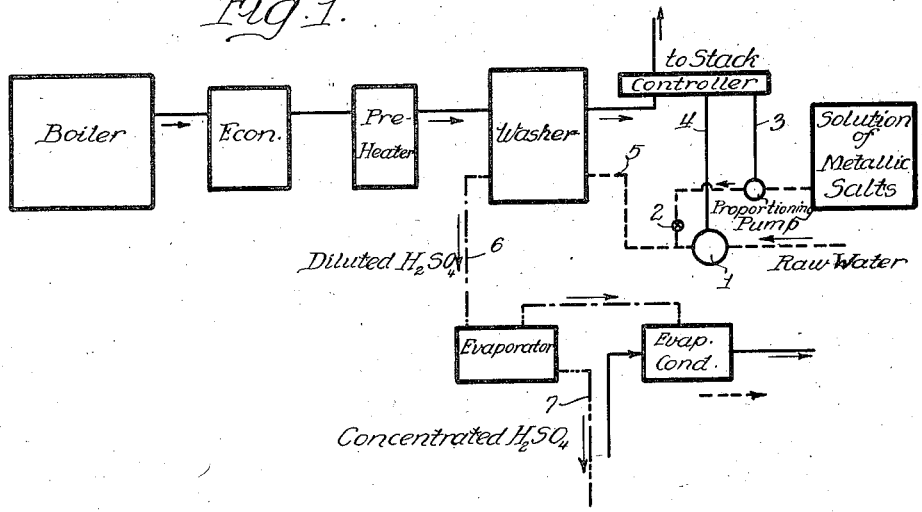
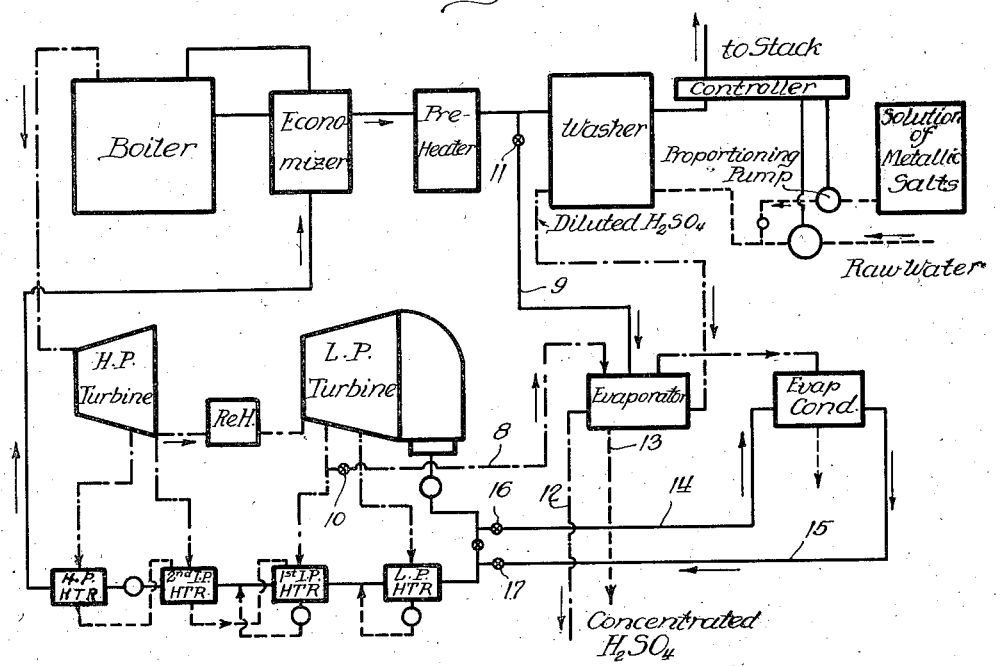
Inventor:
Henry F. Johnstone.

Patented Nov. 26, 1935

2,021,936

UNITED STATES PATENT OFFICE 2,021,936

REMOVAL OF SO₂ FROM FLUE GASES

Henry F. Johnstone, Urbana, Ill., assignor to Board of Trustees of the University of Illinois, Urbana, Ill., a corporation of Illinois Application December 8, 1930, Serial No. 500,684

9 Claims. (Cl. 23—167)

This invention relates generally to the treatment of flue gases and the like containing obnoxious or disagreeable substances, with the object of removing these substances before discharging the gases into the atmosphere, so as to render the gases substantially innocuous or such as not to constitute annoyance or detriment to animal and vegetable life as well as to buildings and materials in the vicinity of the discharge.

A particular object of the invention is concerned with the removal of sulphur dioxide from flue or stack gases or from any other gases containing sulphur dioxide or other sulphur derivatives.

Flue gases are discharged through smoke stacks or chimneys into the atmosphere. The annoyance which may be caused by the discharge depends on various factors, such as the height of the chimney or smoke stack, and on the constituents of the gases thus discharged.

The gases contain solid material such as grit, soot and the like, and gaseous substances, such as sulphur oxides which may prove highly detrimental due to their corrosive influence upon the vicinity. The atmosphere is polluted and this pollution is manifest in various ways due to the precipitation of the constituents of the flue gases upon the ground, buildings, and upon vegetable life.

The extent of pollution is dependent upon the concentration of gases in the atmosphere, and this concentration may reach considerable proportions in crowded districts, particularly when the rapid increase in the size of individual industries, such as power stations, is considered. A further factor which must be taken into account when viewing the pollution of the atmosphere, is presented by the employment of artificial draft which naturally reduces the height of a smoke stack or chimney as compared with the height thereof when provided for natural draft. Gases emitted from a high smoke stack will be more widely diffused by air currents, while those emitted by relatively low smoke stacks will tend to precipitate their contents near the place of emission, i. e., near the smoke stack of the power station or other industry from which they issue.

The concentration of pollution increases with the increase of coal consumption (neglecting for the moment the grade and kind of coal used) and this is true regarding the soot and grit contents of the gases as well as relative contents of sulphur oxides.

The diffusion of sulphur oxides in the air is of different character than the diffusion of soot and grit. The latter falls to the ground in the form of ashes and dust particles. The sulphur oxides, however, diffuse into the air like any other gases and are carried with the air currents. Instead of precipitating to the ground like dust particles, they precipitate in the form of sulphurous and sulphuric acid after combining with rain, moisture and water. The problem of combating damage caused by sulphur oxides is therefore more difficult. It varies greatly in amount and is subject to prevailing weather conditions.

The magnitude of the potential annoyance will at once be realized if it is considered that an industry consuming daily about 1000 tons of coal containing 1 percent combustible sulphur will liberate with the flue gases the equivalent of 20 tons of sulphurous acid or 30 tons of sulphuric acid which are dumped diluted on the vicinity in a manner and at places entirely beyond human control. Topographic and atmospheric conditions may contribute towards producing active damage.

It will be understood, of course, that the above intimated problem does not arise solely in connection with modern industry or large power stations. It will be found that the smoke stacks of residential districts and those of smaller industries contribute a larger percentage to the total of smoke annoyance when the problem is viewed from a wider perspective.

It has been proposed in the past to remove an industry which presents such problem to a site or area which would not suffer from the inherent dangers of the smoke nuisance. Other proposals are concerned with erecting suitably designed smoke stacks of sufficient height so as to provide a more effective dispersion and diffusion of the flue gases into the atmosphere.

These suggestions, while presenting certain advantages, prove impractical in many cases and ignore the fact that residential and housing districts as well as small industrial enterprises must be included in the problem since they contribute combined a greater percentage to the total smoke nuisance than the large individual industries such as power stations.

Several other suggestions have been made in the past and shall be discussed presently. I first wish to recall certain antecedents which should be known if the problem is to be correctly stated and understood.

The cause for the presence of ash and sulphur in the flue gases is found largely in the grade and kind of coal. Either content is objectionable. Ash content is objectionable because it tends to reduce the boiler efficiency and has to be disposed of as an undesirable product of operation, and sulphur content is objectionable because it causes damage to the plant with resultant operation troubles. However, neither can be eliminated entirely because each resides in the different coals in varying proportions.

The selection of coal for industrial purposes is dictated by the economy of operation, and there are many instances where coal having high ash or sulphur contents has to be decided upon because it will meet the demands of economic operation which must in any case conform to the requirement: maximum output with minimum cost.

Sulphur may occur in coal in different forms and combinations.

For example, it may occur as pyritic sulphur, in the form of veins in the coal; it may occur as sulphate sulphur, in the form of calcium sulphate and other combinations; and it may occur as organic sulphur, forming an integral part of the coal.

Various processes are being practiced for cleaning the coal at the mine. The coal may be ground and the dust may be separated afterwards, whereby pyritic sulphur is to some extent removed from the coal. Various washing and dry cleaning processes are being employed for removing the sulphur contents. Such mechanical processes are to some extent successful in removing pyritic and sulphate sulphur as well as other impurities. In case of organic sulphur which forms an integral part of the coal, these processes are practically ineffective. The value of cleaning the coal is, furthermore, doubtful since the cleaning process increases the price of the coal while the saving which might be effected by the use of clean coal is problematic.

Raw coal containing sulphur, when fired, will produce flue gases containing sulphur dioxide and sulphur trioxide.

There are several systems in vogue which attack the problem of smoke nuisance by treating the flue gases with the aim of removing these obnoxious substances from the flue gases in order to avoid annoyance and detriment when the gases are liberated into the atmosphere.

One system employs centrifugal separators for removing the dust and ash particles, but does not attack the problem of removing the sulphur dioxide from the gases. This latter problem, however, is a more insidious one than the problem of ash removal, since it harbors greater potential dangers.

Other systems use electrostatic devices for separating the ash contents from the flue gases. These, as the first mentioned system, leave the problem of removal of sulphur dioxide generally untouched.

There are several other systems known and practiced for removing the ash contents, such as the systems using hoppers and settling chambers for separating the ash and collecting the same before the flue gases are discharged.

Systems have also been evolved for washing and scrubbing the flue gases with the object of removing the dust and grit. Such gas washers consist, generally speaking, of chambers through which the flue gases pass, having devices within the chambers for spraying the flue gases with water. The effect is a purification of the flue gases, resulting in a removal of ash constituents and smoke. The sulphur dioxide content is also somewhat reduced in such process. There are several such systems known.

Now, with the foregoing brief review of the state of the art in mind, I shall proceed to enter into a discussion of my invention.

The primary object of my invention is concerned with a novel process for washing and scrubbing the flue gases in order to remove the sulphur dioxide therefrom. Other objects will appear as the discussion of the invention proceeds.

The theoretical basis of the invention is briefly outlined as follows:

When a gas composed of several components is brought into contact with a liquid, each component tends to distribute itself between the liquid and gas phase so that the ratio of its concentration in the two phases is constant. Thus, $$\frac{C_{SO_2} \text{ in gas}}{C_{SO_2} \text{ in liquid}} = K.$$

The value of the distribution constant, $K$, depends upon the character of the gas and the dissolving liquid and upon the temperature.

Because of the very small concentration of $SO_2$ and $SO_3$ in the flue gases, the concentration of $SO_2$ and $SO_3$ that may exist in the liquid is correspondingly small.

Now, if it is desired to remove the $SO_2$ and $SO_3$ contents from the flue gases by washing and scrubbing the gases with water, the above reasoning shows that for the removal of these components from the very large volume of gas produced by a boiler, a correspondingly large volume of water is required. Thus, it may be shown that for the removal of 75% of sulphur dioxide in the gases from 1 ton of coal containing 4% sulphur, 21,000 gallons of water would be required at 25° C. If the temperature of the water were 50° C., 57,300 gallons would be required.

This necessity for enormous quantities of water represents a serious obstacle and handicap in the way of devising an efficient washing method for removing the sulphur dioxide and sulphur trioxide from flue gases and from other gases containing sulphur.

The percent of $SO_2$ removed from the gas mixture by pure water is initially high but decreases as the concentration of $SO_2$ in the water increases. I have made experiments and have obtained the following results: Using the standard rate of flow (0.510 cu. ft. of air and 0.00166 cu. ft. of $SO_2$ and using 0.8 gallons of water) 89% of the $SO_2$ was removed during the first eleven minutes. After fifteen minutes (total) the value had dropped to 84%, and after thirty-seven minutes the accumulative amount of $SO_2$ removed was only 64% of the total amount introduced. At this time practically all of the $SO_2$ was passing through the washer.

This experimental result is in keeping with the reasoning presented previously. The effect of the water decreases as the concentration of $SO_2$ increases. Correspondingly larger quantities of water would have to be employed in order to offset this effect of concentration.

A consideration of the equation given previously will show that if the $SO_2$ dissolved in the water is by some means steadily removed, more and more $SO_2$ will be dissolved in order to satisfy the equation. If the removal of the $SO_2$ from the water takes place as fast as the gas is brought into contact with the liquid, the amount of water required would be reduced to a very small fraction of the values given previously.

I therefore aimed to increase the solubility of sulphur dioxide in water to such an extent that the amount of water required for the removal of sulphur dioxide would make the process mechanically and economically feasible.

Another consideration which now arises is concerned with the disposal of the sulphur contents extracted from the washing water. I have conceived the possibility of producing sulphuric acid or other products in the process of removing sulphur dioxide contained in the flue gases. The acid produced may be of any dilution but low concentrations may be concentrated by a process of evaporation or by other methods.

Flue gases contain, besides the $SO_2$, a considerable amount of oxygen which, under suitable conditions, may combine with $SO_2$ to form $SO_3$. The latter is extremely soluble in water because it unites with it to form sulphuric acid.

I therefore directed my efforts toward bringing about the reaction between the dissolved $SO_2$ and oxygen so that the amount of water required would be greatly reduced. I found that the rate of reaction between $SO_2$ and oxygen may be increased by the presence of minute quantities of certain metallic ions, or salts. Such an induced reaction is known as catalysis and the inducer, which remains unchanged, is called a catalyst.

In the present invention I employ the term catalyst to define any metallic ion which speeds up the oxidation reaction without at any time becoming permanently altered.

I determined the catalytic effect of metallic ions under conditions resembling conditions which exist in practice. A mixture of air and $SO_2$ were passed at high velocity through pure water with the results noted previously. Using the same ratio of air and $SO_2$ (0.325% $SO_2$), the same velocity, and the same conditions of temperature, volume of water, etc. the effect of a small amount of dissolved metallic salt was determined. The amount of $SO_2$ removed from the gas was found by measuring the rate at which the $SO_2$ came from the washer and comparing it with the rate at which it was introduced.

A small amount of manganese was employed as a catalyst in the washing water in one test. Compared to the values for pure water those obtained for water containing 0.028% manganese, added in the form of 9.45 lbs. manganese sulphate per 1,000 gallons of water, are as follows:

For the first 36 minutes 96.6% of the $SO_2$ was removed; for 61 minutes 96.2% was removed; for 327 minutes 94.1% was removed; and for 3,226 minutes 87.7% of the $SO_2$ was removed. Even after such a long time there was scarcely any odor of $SO_2$ in the washing solution. Evidently the $SO_2$ dissolved in the water had been entirely converted to sulphuric acid and the catalytic effect of the trace of manganese was great enough to remove the $SO_2$ as fast as it was put into the solution.

Several metallic salts have been found to act as catalysts for the oxidation of $SO_2$ in solution. I have given above the results of tests obtained with manganese and have compared them with the results obtained by using pure water in order to illustrate the principle which I employ and to show its practical value.

The following points should be observed:

The acid concentration is proportional to the amount of gas washed per gallon of water. I have found that the efficiency of $SO_2$ removal varies in accordance with both the concentration of the catalyst and also the acid concentration of the solution. Above the upper limit of the critical range of concentration of the catalyst the efficiency of $SO_2$ removal is substantially independent of the concentration of the catalyst over a relatively long range of acid concentration and tends to drop off as the acid concentration is materially increased. As the concentration of the acid increases, it has been found that a concentration of the catalyst somewhere below its upper critical limit is even more efficient than the higher concentrations of the catalyst. The efficiency of the removal is therefore greatest, for higher acid concentrations, at or slightly below the upper limit of the critical range of concentration.

Below the lower limit of the critical range of concentration of the catalyst the efficiency of the catalyst falls off rapidly as the acid concentration builds up, although even below this lower limit the presence of small traces of the catalyst produces some increase in efficiency of $SO_2$ removal over that produced with only clear water. This efficiency, however, is considerably below the efficiency of $SO_2$ removal produced when operating within the critical range of concentration.

The critical range of concentration of manganese ions, I have found, extends from a lower limit of approximately 28 parts per million to an upper limit of approximately 280 parts per million, or, expressed in another manner, from 28 milligrams per liter to 280 milligrams per liter. To simplify this expression of the critical range of concentration, I have indicated this range as from 0.0028% to 0.028% concentration by weight. Similarly for ferric (iron) ions, the critical range of concentration outside of which the efficiency falls off rapidly is from 0.14% to 0.42% by weight.

A mixture of two catalysts often produces much greater effect than that of either one alone. Such action is known as promoter action. Thus, the efficiency of 0.0028% manganese and 0.07% iron is several times that of the same concentrations of manganese or iron alone.

If the accumulating acid in the washing solution is removed the efficiency of the scrubbing is increased and much more gas can be washed with a given quantity of water.

The washing solution containing an original concentration of 0.07% ferric iron may be circulated over scrap iron. In this case, the iron not only serves to remove the accumulating acid to form hydrogen gas but it also builds up the concentration of the catalyst at the same time. The hydrogen gas and iron sulphate may be considered as by-products of the washing in this case instead of the sulphuric acid produced when scrap iron is not used.

Other materials may be used for the removal of the accumulating acid such as iron oxide which occurs in the slag and ash from the coal. The washing solution may be recirculated thru the ash. However, there would be no hydrogen gas as a by-product in this case.

It should be observed that a trace of copper either as the metal in contact with the solution or as a salt in the solution destroys the catalytic effect of manganese ions. This is not true with catalysis by iron salts. Salts of chromium, nickel and zinc do not inhibit the action of manganese ions. Nickel ions will even act slightly as a promoter.

Other metallic ions which, under certain conditions, will give catalytic effects are, cerium, zinc, cobalt, vanadium, titanium, and others.

Promoter action, of course, must be considered also.

Several metallic salts have been found to act as catalysts for the oxidation of $SO_2$ in solution. I have given the results of tests obtained with manganese and have compared them with the results obtained by using pure water in order to illustrate the principle which I employ and to show its practical application.

It will be seen from the above discussion that the novel method for washing flue gases, which I have invented, provides for adding to the washing water a small amount of a suitable metallic salt in order to increase the apparent solubility of sulphur dioxide to such an extent that the amount of water required for the removal of $SO_2$ is reduced to a point at which the washing process is mechanically and economically feasible.

A specific example of the application of my invention resides in the scrubbing of gases from furnaces in which high sulphur coal is burnt. Another example is its application to the removal of sulphur compounds from smelter fumes. The application of my invention is, of course, not limited to these examples but includes the removal of sulphur compounds from any gases in which they may occur.

The method, while chiefly directed to the removal of $SO_2$ from gases, must be considered to cover broadly the purification of gases since it also accomplishes the precipitation of solid particles contained in the gases.

Now, as to the disposal of the sulphur dioxide removed from the gases, it will be recalled that the same may be converted into sulphuric acid which may be disposed of commercially. Other by-products may be obtained depending on the catalyst used in the washing process.

Sulphuric acid may be produced by the use of relatively small quantities of manganese salts as catalysts. It may also be produced by the presence of relatively larger quantities of salts of iron, in accordance with the critical ranges of concentration referred to heretofore. The dissolved iron may be removed by concentrating the acid, since ferric salts are insoluble in acid above a certain concentration. The use of manganese or iron as catalysts will be determined by the economy which is desired.

Ferric sulphate and hydrogen may be produced by circulating the washing solution containing the catalyst over iron. The iron may be obtained in the form of scrap or from the crude iron produced in the slag-tap furnaces. In this case, the catalyst is produced as a by-product of the reaction. The acid formed is removed by its action on the iron to form hydrogen and ferrous sulphate. The latter is rapidly oxidized to ferric sulphate by the flue gases containing oxygen and sulphur dioxide. Hydrogen can thus be produced in very pure form and disposed of commercially.

Ferric sulphate alone may be produced by passing the washing solution over oxides of iron. The reaction of the iron on the oxide in the ash may be sufficient to remove most of the acid.

There are, of course, other by-products which may be produced efficiently. For example, gypsum may be produced by using lime for neutralizing the sulphuric acid. I have furnished above a number of examples of the possibility of providing various by-products in the scrubbing process and, it will be understood, that these examples do by no means exhaust the subject. I have also listed certain catalysts which may be employed but there are others which will be found useful in accordance with the teachings of my invention.

Now, in order to show how my invention may be applied to practical use, I will describe the invention with reference to the accompanying diagram in which:

Figure 1 represents a simple cycle consisting of a washer, a tank containing a concentrated solution of metallic salts, a small amount of which is applied to the washing water by means of a proportioning pump, thereby purifying the stack gases and removing the sulphur dioxide therefrom; and Figure 2 illustrates the coupling of the washing and scrubbing process with the steam cycle in an industrial plant, such as a power station.

A short description of the arrangements shown in Figures 1 and 2 will suffice for conveying an accurate understanding of the operation of the novel gas washing and scrubbing process. The individual parts and mechanisms shown in the figures are labeled with designations which denote their functions. The functions of certain parts such as the boiler, economizer, pre-heater, etc., are assumed to be known, and the following discussion will therefore be limited to those parts which have particularly to do with the novel washing process and to the cooperation thereof with and within the systems shown.

Referring now particularly to Figure 1, I have shown a washer through which the gases pass on their way to the smoke stack or chimney. The flue gases are washed and scrubbed in this washer in order to remove the sulphur dioxide and other contents. The washing is accomplished by a solution of metallic salts automatically mixed with the raw water which is passed to the washer through a suitable pipe line. The metallic ions or salts bring about a rapid reaction between the dissolved $SO_2$ and oxygen as was described previously. The amount of water necessary for accomplishing the removal of $SO_2$ from the flue gases is thereby reduced to a practical minimum. A meter designated by numeral 1 may be interposed in the pipe line feeding raw water. A valve 2 is shown interposed between the proportioning pump and the water pipe. When this valve is open, the solution of metallic salts can enter the water line and mix with the raw water which is being fed to the washer over the line 5.

The washer may be of the type and form disclosed in Patent No. 1,318,774 of October 14, 1919. The flue gases pass through a rotating disk and are spread out within the washer. The washing liquid enters the washer by a pipe line which directs the same upon the rotating disk, spreading the washing fluid laterally by centrifugal force and thereby providing a fluid curtain or screen through which the gases must pass. Solid particles will be eliminated from the flue gases within the washer and may be collected in a suitable hopper for removal from the washer.

It will be understood that the amount of water and of the solution of metallic salts to be fed to and mixed with the raw water will be determined by the amount or volume of flue gases which pass through the washer in a given time. The contents of $SO_2$ in the flue gases may vary, depending on the coal burnt. Such contents will also be a factor in determining the amount of a given solution of metallic salts in the washing water. The proper mixing of the solution of metallic salts with the raw water and the amount of water needed for a given condition (type of coal and amount or volume of flue gases for a given time) may be automatically regulated by a controller disposed in the funnel leading to the stack or chimney, as I have indicated in Figure 1.

This controller maintains connection with the proportioning pump over the control line 3 and with the meter 1 over the control line 4. Both the proportioning pump and the meter 1, that is to say, the supply of raw water and of the solution containing the catalyst (metallic salt solution) will therefore be controlled automatically in accordance with the demand for either or for both. The operation of the controller may be determined by suitable adjustment according to the coal which is being burned. This adjustment is made prior to firing a certain grade of coal. The effect of the adjustment of the controller results in a predetermined mixture of washing liquid in accordance with the coal used, and the function of the controller during the firing of this coal will regulate the washing mixture in accordance with the volume of flue gases passing through the funnel which leads to the chimney. The controller may be located either as is shown, between the washer and the smoke stack, or it may be connected so that it precedes the washer.

If the washing solution is recirculated the recirculation may be controlled by the concentration of sulphuric acid, or other by-product coming from the washer. That is, sufficient makeup is added continuously to compensate for the amount of solution removed. This proportion may be maintained by a device, the operation of which depends upon the electrical conductivity of the acidity of the washing solution.

Pipe line 5 is connected to the washer and feeds the washing mixture to the rotating disk within the washer which spreads the mixture and provides the liquid screen. The flue gases pass through this screen (an examination of the aforementioned patent will elucidate this action) and the solid particles will collect in suitable provisions, such as a hopper at the bottom of the washer. Due to the action of the catalyst in the washing water the solubility of $SO_2$ is increased and a rapid reaction is brought about between the $SO_2$ and oxygen. Diluted sulphuric acid ($H_2SO_4$) will leave the washer through pipe line 6 as indicated.

The diluted sulphuric acid may now be concentrated, for example, by a process of evaporation. The evaporator shown in Figure 1 is assumed to be a direct fired one. It yields concentrated sulphuric acid over the line 7. Further concentration may be accomplished by means of the evaporator condenser shown in the drawing.

Figure 2 shows one manner of coupling the washing process with the steam cycle. The washer used in this embodiment may be of the same type as employed in the previous example. Likewise, the tank for the solution of metallic salts and the connection to the water supply as well as the control for the mixing of the washing liquid may be the same. Bled-steam is supplied to the evaporator over the pipe line 8 in addition to the heat of flue gases supplied over line 9. These connections operate over valves 10 and 11, respectively, as shown. Concentrated sulphuric acid is obtained at 12. This cycle is feasible provided the heat used in the washing and concentration process is returned to the steam cycle in such a way as to compensate for the apparent loss in the regenerative cycle. The line 13 is connected to the regenerative cycle. The evaporator condenser may be connected to the regenerative cycle by means of lines 14 and 15 over suitable valves 16 and 17.

The concentration of sulphuric acid may be carried out differently if desired. As shown, the diluted sulphuric acid is concentrated by a process of evaporating the water. The problem of concentrating the diluted acid may, of course, be obtained from the standpoint of removal of the acid from the water, rather than the removal of water from the acid. My invention includes either possibility and is not limited to any specific procedure.

It will be seen from the above description that I have invented a novel method for removing $SO_2$ from gases, which will be particularly useful in connection with industrial plants but is not limited to the use in such plants. Simultaneously with the removal of $SO_2$, the gases are cleaned of other impurities. Sulfuric acid may be obtained as a by-product of the washing of the flue gases. The use of certain catalysts, such as iron, and recirculation of the washing water over scrap iron will produce other by-products such as ferric sulphate or hydrogen.

Modifications of my invention may be devised, changing either certain functional steps or devising modifications in detail, or both, without adding to the scope of my disclosure. I therefore desire to have it understood that I do not intend to be limited strictly to the physical structure of my invention nor to the use of specific catalysts, otherwise than I have defined in the following claims.

What I claim as my invention is:—

1. The method of removing sulphur dioxide from flue gases which comprises washing said gases containing free oxygen with a solution containing ferric ions and manganese ions in solution as catalysts and promoters to increase the oxidation of the sulphur dioxide into sulphuric acid by the free oxygen in said gases, the concentration of ferric ions being relatively great with respect to the manganese ions.

2. The method of removing sulphur dioxide from flue gases which comprises washing said gases containing free oxygen with a solution containing as a catalyst a small percentage of ferric ions only to dissolve the sulphur dioxide into said solution, said dissolved sulphur dioxide forming sulphuric acid in said solution and removing the sulphuric acid from the solution by passing the solution over iron and iron oxides to regenerate said solution.

3. The method of removing sulphur dioxide from flue gases containing the same and free oxygen which comprises washing said gases with a solution containing ferric ions and manganese ions, said ions acting as catalysts and as promoters, to increase the quantity of sulphur dioxide removed from said gases into said solution.

4. The method of treating sulphur dioxide bearing gases containing free oxygen to remove sulphur dioxide therefrom which comprises washing said gases with water containing substantially 280 milligrams per liter of manganese ions as a catalyst to form sulphuric acid in said solution by the oxidizing effect of the free oxygen present in said gases.

5. The method of removing sulphur dioxide from gases in the presence of free oxygen which comprises washing said gases with an aqueous solution to absorb sulphur dioxide into said solution, said sulphur dioxide being oxidized during said absorption, and maintaining a concentration of not less than 0.14 nor more than 0.42% by weight of ferric ions acting as a catalyst to increase the apparent solubility of sulphur dioxide in said solution.

6. In a purification system for removing obnoxious constituents from waste gases containing free oxygen discharged from an industrial plant, the method of increasing the quantity of sulphur dioxide removed from said gases which comprises washing said gases with a solution containing from 1.5 to 4 grams per liter of ferric ions only acting as a catalyst to accelerate the dissolution of sulphur dioxide into said solution, said dissolved sulphur dioxide forming sulphuric acid in said solution, and removing said sulphuric acid from said solution to regenerate the solution.

7. The method of removing sulphur dioxide from gases containing the same and free oxygen which comprises washing said gases with an acid solution containing ferric ions and manganese ions acting as catalysts and promoters to produce increased removal of sulphur dioxide from said gases into said solution, said dissolved sulphur dioxide forming sulphuric acid in said solution, and removing said sulphuric acid from said solution.

8. The method of removing sulphur dioxide from gases containing the same and free oxygen which comprises washing the gases with a solution containing a catalyst comprising from substantially 28 to 280, inclusive, milligrams per liter of manganese ions present in the solution to increase the quantity of sulphur dioxide dissolved in said solution.

9. The method of removing sulphur dioxide from gases containing the same and free oxygen, which comprises passing said gases through a washer, intimately contacting said gases within said washer with a solution containing as a catalyst not less than 28 milligrams per liter nor more than 280 milligrams per liter of manganese ions to dissolve said sulphur dioxide in said solution, and removing sulphuric acid from said solution by passing said solution over iron and iron oxides.

HENRY F. JOHNSTONE.